(12) United States Patent
Choi

(10) Patent No.: US 6,538,754 B2
(45) Date of Patent: Mar. 25, 2003

(54) METHOD OF MEASURING THICKNESS OF CELL GAP OF REFLECTIVE TYPE LIQUID CRYSTAL DISPLAY

(75) Inventor: Wing-Kit Choi, Hsinchu (TW)

(73) Assignee: AU Optronics Corp, Hsinchu (TW)

( * ) Notice: Subject to any disclaimer, the term of this patent is extended or adjusted under 35 U.S.C. 154(b) by 47 days.

(21) Appl. No.: 09/834,872

(22) Filed: Apr. 12, 2001

(65) Prior Publication Data

US 2001/0048528 A1 Dec. 6, 2001

(30) Foreign Application Priority Data

Apr. 12, 2000 (TW) ........................................ 89106779 A

(51) Int. Cl.[7] ............................................. G01B 11/28
(52) U.S. Cl. ........................ 356/630; 356/632; 356/367; 356/364; 356/366
(58) Field of Search ................................ 356/630, 632, 356/367, 364, 366

(56) References Cited

U.S. PATENT DOCUMENTS

| | | | | |
|---|---|---|---|---|
| 4,699,516 A | * | 10/1987 | Bartz et al. ................. | 356/445 |
| 4,806,776 A | * | 2/1989 | Kley .......................... | 250/560 |
| 5,239,365 A | * | 8/1993 | Inoue ......................... | 356/367 |
| 5,434,671 A | * | 7/1995 | Sumiyoshi et al. ......... | 356/367 |
| 5,966,195 A | * | 10/1999 | Sato et al. .................. | 349/187 |
| 5,978,053 A | * | 11/1999 | Giles et al. .................. | 349/17 |
| 6,081,337 A | * | 6/2000 | Kwok et al. ................ | 356/376 |

* cited by examiner

Primary Examiner—Michael G. Lee
Assistant Examiner—Seung Ho Lee
(74) Attorney, Agent, or Firm—J.C. Patents

(57) ABSTRACT

A method of measuring the thickness of a cell gap of a reflective type liquid crystal display. An optical system having a rotating table, an input polarizer, a beam splitter, and a output polarizer is used. A reflective type liquid crystal device is disposed on a rotating table. An incident light is reflected by the liquid crystal device. The reflective type liquid crystal device is located between the input polarizer and the output polarizer. A beta angle $\beta$ is defined as the angle between the input light polarization and the front liquid crystal director. A first formula is used to express the relationship between the reflectivity $R_\perp$ and $\beta$. The reflectivity is $R_\perp$ then differentiated by $\beta$ to obtain a second formula that express the relationship between $\beta_{max}$ and the thickness of the cell gap. The rotating table is rotated to measure the maximum value $\beta_{max}$ of the angle $\beta$. The thickness d can thus be obtained more precisely.

20 Claims, 4 Drawing Sheets

METHOD OF MEASURING THICKNESS OF CELL GAP OF REFLECTIVE TYPE LIQUID CRYSTAL DISPLAY

CROSS-REFERENCE TO RELATED APPLICATION

This application claims the priority benefit of Taiwan application serial no. 89106779, filed Apr. 12, 2000.

BACKGROUND OF THE INVENTION

1. Field of the Invention

The invention relates in general to a method of measuring the thickness of a cell gap of a reflective type liquid crystal display (LCD). More particularly, the invention relates to a method of measuring a thickness of a cell gap of a reflective type mixed-mode twisted nematic (MTN) liquid crystal display.

2. Description of the Related Art

In the recent years, the liquid crystal display, being supported with the development of relative electronic devices, becomes very widely applied with versatile functions. Consequently, the fabrication of liquid crystal displays becomes more complex. Generally speaking, the liquid crystal display can be categorized into reflective type liquid crystal display, transmissive type liquid crystal display and transflective type liquid crystal display.

In the liquid crystal display, the cell gap is a very important factor to control the characteristics such as brightness, contrast or color. In the current technique for fabricating the liquid crystal display, only the transmissive type liquid crystal display has a measuring method to precisely measure the thickness of the cell gap. This method cannot be applied to the reflective type or transflective type liquid crystal display. If one applies this method to measure the cell gap of the reflective type liquid crystal display, the surface reflection may seriously interfere the correctness of the measurement of the cell gap.

SUMMARY OF THE INVENTION

The invention provides a method of measuring a cell gap of a reflective type liquid crystal display. In addition to precisely measure the thickness of the cell gap, the methods can also eliminate effect induced from the surface reflection of the reflective type liquid crystal display.

A relationship between the maximum value $\beta_{max}$ of a beta angle $\beta$ and a thickness of the cell gap is derived to calculate the thickness of the cell gap in this method.

In the method provided by the invention, an optical system is provided. The optical system comprises a light source, a rotating table, an input polarizer, a beam splitter, a output polarizer and a photodiode. The light source includes a He/Ne laser to produce a light beam incident to the input polarizer. A reflective type liquid crystal display device, for example, a reflective type mixed-mode twisted nematic (MTN) is disposed on the rotating table. The reflective type liquid crystall display device comprises a front liquid crystal director and a rear liquid crystal director. The front liquid crystal director indicates the liquid crystal director at the surface of the reflective type liquid crystal display near the beam splitter. The input polarizer is used to receive and polarize the light beam incident from the light source. The beam splitter receives the light coming from the input polarizer. Two light beams are obtained and output by the beam splitter. One light beam is incident back to the reflective type liquid crystal display and reflected thereby. The output polarizer is used to receive the light beam reflected by the liquid crystal display. Along the optical path, the input polarizer and the output polarizer are located at two sides of the reflective type liquid crystal display. The transmissive axis of the input polarizer is perpendicular to the transmissive axis of the output polarizer. The photodiode is used to receive the light beam from the output polarizer to convert the light beam into an electric current signal.

A beta angle $\beta$ is defined as the angle between the input polarizer and the front liquid crystal director. A formula as follow is provided:

$$R_\perp = \left(\Gamma\frac{\sin X}{X}\right)^2 \left(\sin 2\beta \cos X - \frac{\phi}{X}\cos 2\beta \sin X\right)^2,$$

wherein $\Gamma = 2\pi d \Delta n / \lambda,$ $X = \sqrt{\phi^2 + (\Gamma/2)^2},$ d is the thickness of the cell gap, $\lambda$ is about 632.8 nm, $\Delta n$ is the birefringence (about 0.064), $\phi$ is the twisted angle of the liquid crystal, that is, the angle between the front and back liquid crystal directors, about 80° to 90°.

The reflectivity $R_\perp$ is differentiated by the beta angle $\beta$ to obtain a formula:

$$\frac{dR_\perp}{d\beta} = 0 \Rightarrow \beta_{max} = \frac{\tan^{-1}\left(-\frac{X}{\phi \tan X}\right)}{2},$$

wherein $\beta_{max}$ is a function of d, $\Delta$, $\phi$, and $\lambda$.

According to the second formula, with constant $\Delta$, $\phi$, $\lambda$, $\beta_{max}$ is only the function of the thickness of cell gap d. The rotating table is then rotated to measure the maximum value of the beta angle $\beta_{max}$, so that the thickness of the cell gap d can be derived.

Both the foregoing general description and the following detailed description are exemplary and explanatory only and are not restrictive of the invention, as claimed.

DESCRIPTION OF THE PREFERRED EMBODIMENTS

Figure 1:
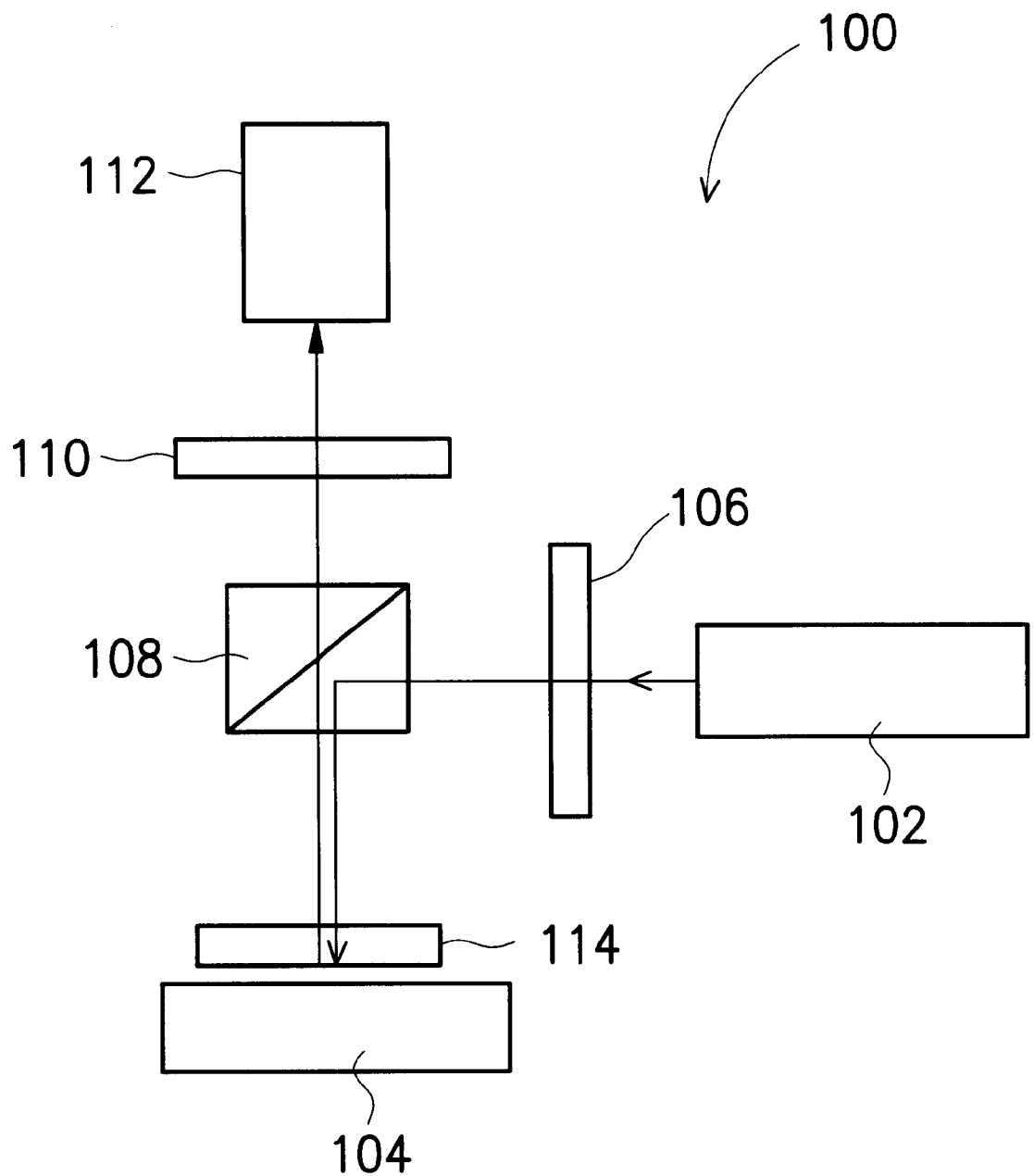
FIG. 1 is an optical path design for measuring a cell gap of a reflective type liquid crystal display according to the invention.

In FIG. 1, an optical path design of the measurement of a cell gap of a reflective type liquid crystal display is according to the invention is illustrated. An optical system 100 comprising light source 102, a rotating table 104, an input polarizer 106, a beam splitter 108, an output polarizer 110, and a silicon photodiode 112 is provided. The light source 102 includes, for example, a He—Ne laser to produce an incident light beam. A reflective type liquid crystal display 114 is disposed on the rotating table 104. The reflective type liquid crystal display 114 includes a mixed-mode twisted nematic (MTN) liquid crystal display, for example. The reflective type liquid crystal display 114 has a front liquid crystal director and a back liquid crystal director. The front liquid crystal director indicates the liquid crystal director at the surface of the liquid crystal display near the beam splitter 108, while the back liquid crystal director indicates the liquid crystal display at the surface far away from the beam splitter 108.

The input polarizer 106 receives the light beam incident from the light source 102 polarizes the light beam. The light beam through the beam splitter 108 is then received and split by the splitter 108 into two light beams. One of the light beams is incident on the reflective type liquid crystal display 114, and is reflected thereby. The output polarizer 110 receives the light beam reflected from the liquid crystal display 114 and transmitting through the beam splitter 108. Along the optical path of this light beam, the input polarizer 106 and the output polarizer 110 are at two sides to provide the function of a crossed polarizer. That is, when the transmission axis of the input polarizer 106 is perpendicular to the transmission axis of the output polarizer 110, the reflection from the reflective type liquid crystal display 114 is eliminated. The photodiode 112 is used to receive the light beam transmitting through the output polarizer 110 and to convert the light beam into an electric current signal.

Figure 2A:
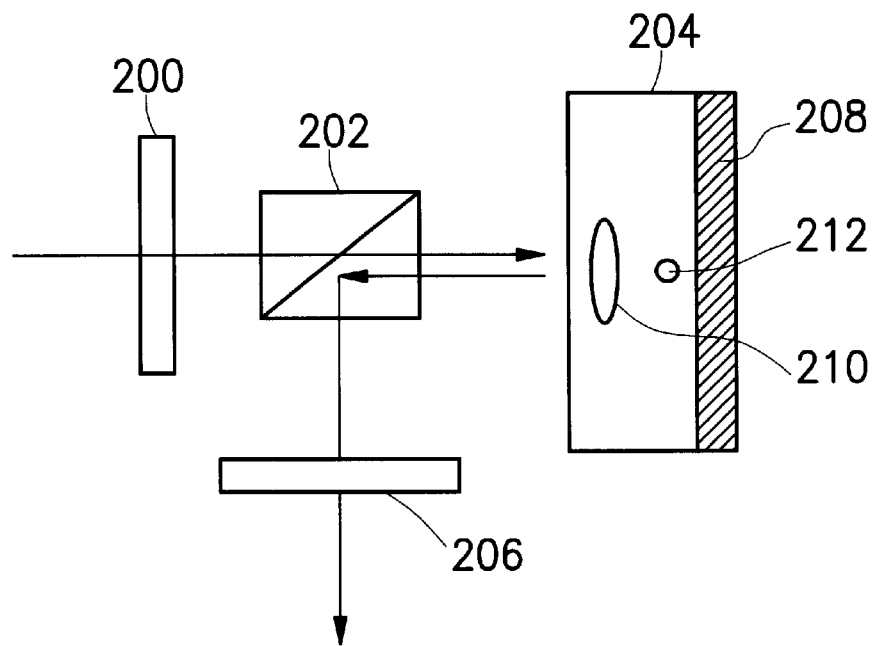
FIG. 2A shows the front and rear liquid crystal directors of the optical path design.

A beta angle, $\beta$, is defined as the angle between the incident polarizer director $P_{in}$ and the front liquid crystal director $L_{front}$. In FIG. 2A, the incident light beam travels through the incident polarizer 200 first, and then travels to the beam splitter 202 to be split into two light beams. One of the light beam is directed to the reflective type liquid crystal display 204 to be reflected thereby. The reflected light beam is then incident to the output polarizer 206. The reflective liquid crystal display 204 further comprises a reflecting mirror 208 on the back surface thereof. The front liquid crystal director $L_{front}$ means the liquid crystal director along the surface near the beam splitter 202, while the back liquid crystal director $L_{back}$ means the liquid crystal director along the surface far away from the beam splitter.

The invention further provides a first formula to express the relationship between the reflectivity $R_\perp$ and the beta angle $\beta$;

$$R_\perp = \left(\Gamma \frac{\sin X}{X}\right)^2 \left(\sin 2\beta \cos X - \frac{\phi}{X}\cos 2\beta \sin X\right)^2,$$

wherein, $\Gamma = 2\pi d \Delta n/\lambda$ $X = \sqrt{\phi^2 + (\Gamma/2)^2}$ ;

d is the thickness of the cell gap;
$\lambda$ is the wavelength of the light source;
$\Delta n$ is the birefringence of the liquid crystal; and
$\phi$ is the twisted angle of the liquid crystal, that is, the angle between the front and back liquid crystal directors.

Figure 2B:
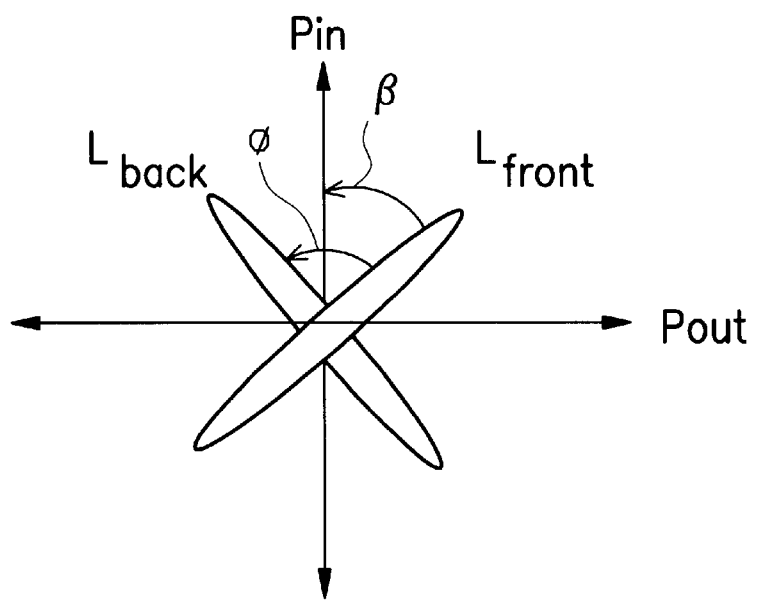
FIG. 2B show the relationship of various angles between the input polarizer and the output polarizer.

The definitions of the beta angle $\beta$ and the twisted angle $\phi$ are clearly depicted in FIG. 2B. The longitudinal axis represents the direction of the transmissive axis $P_{in}$ of the input polarizer, and the horizontal axis represents the direction of the transmissive axis $P_{out}$ of the output polarizer. The front liquid crystal director $L_{front}$ and the back liquid crystal director $L_{back}$ intersect each other at the intersection of the longitudinal and horizontal axes. The beta angle $\beta$ can thus be defined as the angle between the input polarization director $P_{in}$ and the front liquid crystal director $L_{front}$, while twisted angle $\phi$ is defined as the angle between the front and rear liquid directors $L_{front}$ and $L_{back}$.

The reflectivity $R_\perp$ is differentiated by the beta angle $\beta$ to obtain a second formula:

$$\frac{dR_\perp}{d\beta} = 0 \Rightarrow \beta_{max} = \frac{\tan^{-1}\left(-\frac{X}{\phi \Gamma \tan X}\right)}{2},$$

wherein $\beta_{max}$ is a function of d, $\Delta n$, $\phi$, and $\lambda$.

Figure 3A:
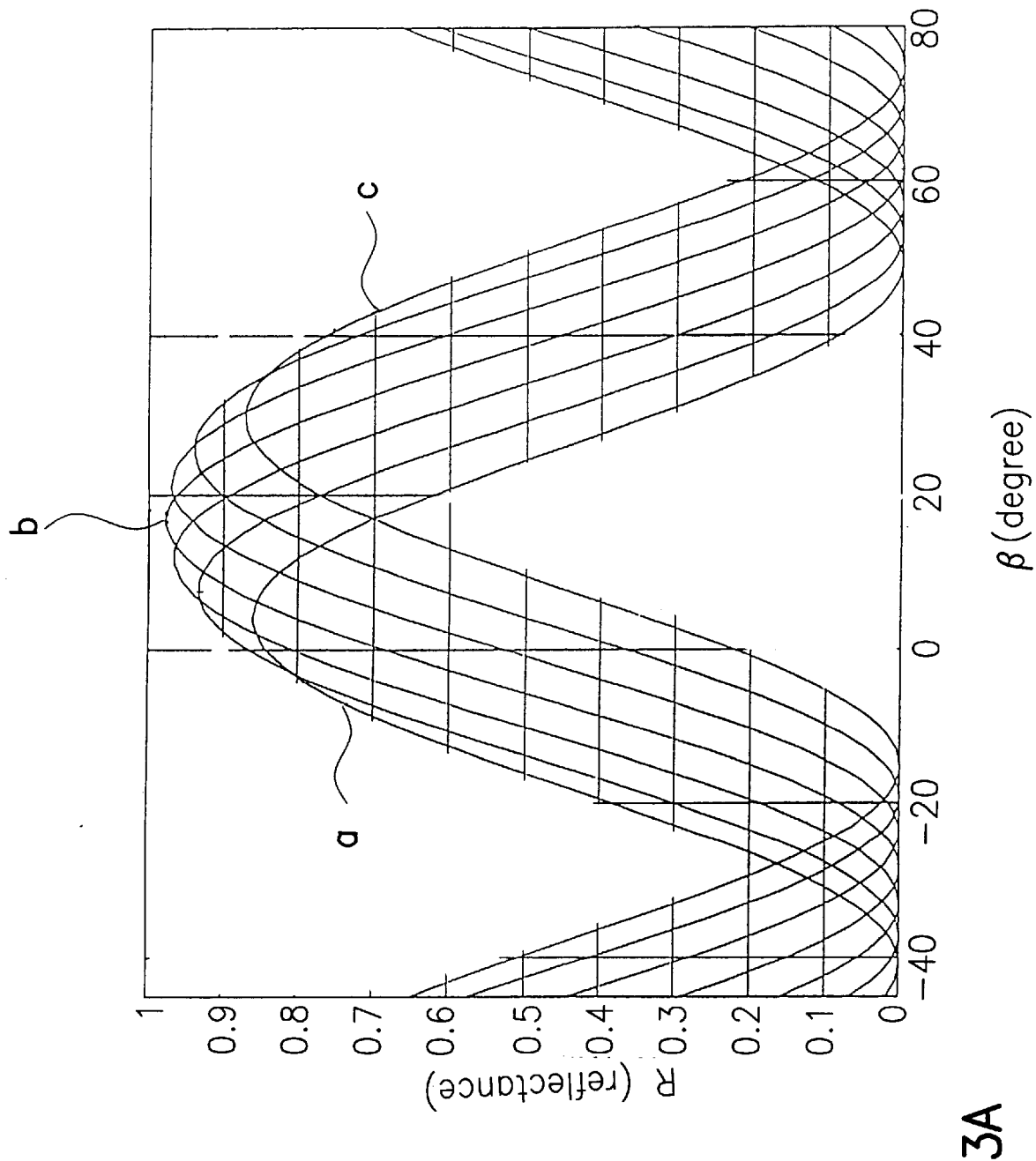
FIG. 3A shows a relationship between the reflectivity $R_\perp$ and the beta angle $\beta$.
Figure 3B:
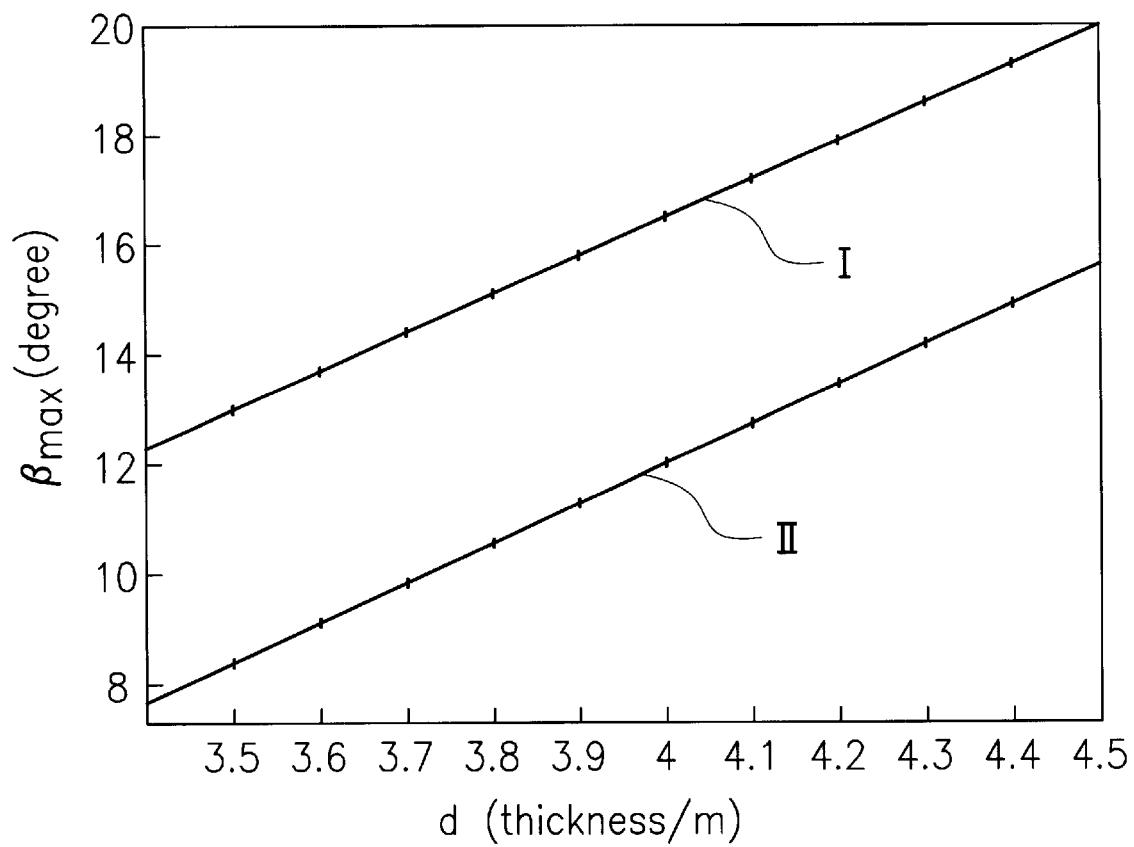
FIG. 3B shows the relationship between $\beta_{max}$ and the thickness of the cell gap.

According to the second formula, provided that d, $\Delta n$, $\phi$ are constant, $\beta_{max}$ is only dependent on the thickness of the cell gap d. For example, when the $\Delta n$ is fixed at about 0.064, $\phi$ is fixed between 80° to 90°, and $\lambda$ is fixed at about 632.8 nm, the thickness of the cell gap d can be obtained from the relationship between d and $\beta_{max}$ as shown in FIG. 3B. It is clear that thickness of the cell gap d is proportional to $\beta_{max}$. The linear curve I represents the relationship when the twisted angle $\phi$ is 80°, and the linear curve II illustrates the relationship when the twisted angle $\phi$ is 90°.

By substituting the above fixed values of $\Delta n=0.064$, $\phi=80°-90°$, and $\lambda=632.8$ nm and the measurement of $\beta_{max}$ into the second formula, the thickness d of the cell gap can be obtained. In the method for measuring the thickness of cell gap d, the magnitude of the light reflected from the liquid crystal display varies when the liquid crystal display is turned. The maximum of the beta angle $\beta$ can thus be obtained when the maximum reflected light is obtained. Table 1 shows an experimental result of the invention.

TABLE

| Item | Twisted angle $\phi$ | Spacer ($\mu$m) | $\beta_{max}$ | Thickness d |
|---|---|---|---|---|
| 1 | 80° | 4.25 | 12 | 4 |
| 2 | 80° | 4.75 | 16.5 | 4.5 |
| 3 | 90° | 4.24 | 16 | 4 |

The invention has at least the following advantages:

(1) The effect of reflection from the reflective type liquid crystal can be eliminated, so that the accuracy of the thickness d is not affected thereby. In the optical system 100, the reflective type liquid crystal display 114 is disposed between the input polarizer 106 and the output polarizer 110. Therefore, as the transmissive axes of the input and output polarizers are perpendicular to each other, the surface reflection is blocked between these two polarizers to eliminate the reflection effect.

(2) The beta angle $\beta$ is defined as the angle between the incident polarizer director $P_{in}$, and the front liquid crystal $L_{front}$. According to the required intensity of the light beam, the beta angle $\beta$ is adjusted. In the normal condition, the beta angle $\beta$ is adjusted to a non-zero value. When the reflected light has a maximum value, the beta angle $\beta$ has its maximum value $\beta_{max}$.

(3) The maximum value of the beta angle $\beta_{max}$ is proportional to the thickness of the cell gap d. According to the second formula, an accurate value of the thickness of cell gap d can be derived.

(4) The first formula provided by the invention can be used as a double check for the derived value of d. As shown in FIG. 3A, each curve showing the relationship between the reflectivity $R_\perp$ and the beta angle $\beta$ represents one different thickness d. For example, the curve a represents a thickness d of 3 µm, curve b is for d=4.5 µm, and curve c is for d=6 µm. The empirical method is to observe the position of the curve. When the curve is shifted (towards left or right for decrease or increase of d, respectively), the thickness d is changed.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of measuring a thickness of a cell gap in a reflective liquid crystal display, comprising:
    providing a light source to produce a light beam incident onto an optical system, wherein the optical system comprising:
        a rotating table, on which a reflective liquid crystal display is disposed, the reflective liquid crystal display comprising a front liquid crystal director and a back liquid crystal director;
        an incident polarizer, to receive the light beam incident from the light source, and to polarize the light beam;
        a beam splitter, to receive the light beam polarized by the incident polarizer and to split the light beam coming from the incident polarizer into two split light beams, wherein one of the split beams is incident onto the reflective liquid crystal display and reflected thereby;
        an output polarizer, to receive and polarize the light beam reflected by the reflective liquid crystal display, wherein the incident and output polarizers are located at two sides of an optical path of the reflective liquid crystal display; and
        a photodiode, to receive the light beam transmitting through the output polarizer, and to convert the light beam into an electric current signal;
    defining a beta angle as an angle between the incident polarizer and the front liquid crystal director;
    obtaining a formula between a reflectivity $R_\perp$ and a beta angle $\beta$ as:

$$R_\perp = \left(\Gamma \frac{\sin X}{X}\right)^2 \left(\sin 2\beta \cos X - \frac{\phi}{X} \cos 2\beta \sin X\right)^2,$$

$\Gamma=2\pi d\, \Delta n/\lambda$, $X=\sqrt{\phi^2+(\Gamma/2)^2}$, d is a thickness of a cell gap of the reflective $\Delta n$ is the birefringence of the liquid crystal, $\phi$ is a twisted angle the liquid crystal, and $\lambda$ is a wavelength of the light source;
    differentiating the formula of $R_\perp$ by the beta angle obtaining a relationship between a reflectivity $R_\perp$ and a beta angle $\beta$ as a second formula:

$$\frac{dR_\perp}{d\beta}=0 \Rightarrow \beta_{\max} = \frac{\tan^{-1}\left(-\frac{X}{\phi \tan X}\right)}{2},$$

wherein $\beta_{max}$ is a function of d, $\Delta n$, $\phi$ and $\lambda$; turning the rotating table to measure $\beta_{max}$; and substituting the values of $\beta_{max}$, $\Delta n$, $\phi$ and $\lambda$ into the second formula to derive the value of d.

2. The method according to claim 1, wherein the step of providing the light source comprises provides a He/Ne laser.

3. The method according to claim 1, wherein the reflective liquid crystal display comprises a mixed-mode twisted nematic liquid crystal display.

4. The method according to claim 1, wherein the incident and output polarizers comprise transmissive axes perpendicular to each other.

5. The method according to claim 1, wherein the front liquid crystal director is a liquid crystal director along a surface near the beam splitter.

6. The method according to claim 1, wherein the back liquid crystal director is a liquid crystal director along a surface far away from the beam splitter.

7. The method according to claim 1, wherein the twisted angle $\phi$ is an angle between the front and the back liquid crystal directors.

8. The method according to claim 1, wherein the twisted angle $\phi$ comprises a range of 80° to 90°.

9. The method according to claim 1, wherein $\Delta n$ comprises a quantity of 0.064.

10. The method according to claim 1, wherein $\lambda$ comprises a quantity of 632.8 nm.

11. A method for measuring a thickness of cell gap of a reflective liquid crystal display, comprising:
    providing the reflective liquid crystal display, wherein the reflective liquid crystal display has a front liquid crystal director and a back liquid crystal director;
    providing an optical system comprising:
        a rotating table to dispose the reflective liquid crystal display thereon;
            an input polarizer to receive and polarize a light beam produced by a light source;
            a beam splitter to split the light beam polarized by the input polarizer into two split light beams, wherein one of the split light beam is incident onto the reflective liquid crystal and is reflected thereby;
            an output polarizer to receive the light beam reflected by the reflective liquid crystal display, wherein the input and output polarizers are disposed at two sides of the reflective liquid crystal display; and
            a photodiode, to receive the light beam from the output polarizer and to convert the light beam into an electric current signal;
    defining an angle between the front liquid crystal director and the input polarizer as a beta angle $\beta$;
    differentiating a function of reflectivity $R_\perp$ of the beta angle $\beta$ by a factor of a twisted angle $\phi$, wherein the twisted angle $\phi$ is the angle between the front and the back liquid crystal directors to obtain a maximum value of the beta angle $\beta_{max}$; and
    measuring the value of $\beta_{max}$ by turning the rotating table; and
    substituting the measured value of $\beta_{max}$ to derive the thickness of the cell gap d.

12. The method according to claim 11, wherein the light source comprises a He/Ne laser.

13. The method according to claim 11, wherein the reflective liquid crystal display comprises a mixed-mode twisted nematic liquid crystal display.

14. The method according to claim 11, wherein the input and output polarizers comprise transmissive axes perpendicular to each other.

15. The method according to claim 11, wherein the front liquid crystal director is a liquid crystal director along a surface near the beam splitter.

16. The method according to claim 11, wherein the back liquid crystal director is a liquid crystal director along a surface far away from the beam splitter.

17. The method according to claim 11, wherein the function of reflectivity is expressed as:

$$R_\perp = \left(\Gamma \frac{\sin X}{X}\right)^2 \left(\sin 2\beta \cos X - \frac{\phi}{X}\cos 2\beta \sin X\right)^2,$$

wherein $\Gamma = 2\pi d \Delta n/\lambda$, $X = \sqrt{\phi^2 + (\Gamma/2)^2}$, d is the thickness of a cell gap of the reflective $\Delta n$ is the birefringence of the liquid crystal, $\phi$ is the twisted angle the liquid crystal, and $\lambda$ is the wavelength of the light source.

18. The method according to claim 17, wherein the twisted angle $\phi$ comprises a range of 80° to 90°.

19. The method according to claim 17, wherein $\Delta n$ comprises a quantity of 0.064.

20. The method according to claim 17, wherein $\lambda$ comprises a quantity of 632.8 run.

* * * * *